United States Patent [19]

Pike

[11] Patent Number: 5,151,112
[45] Date of Patent: Sep. 29, 1992

[54] PRESSURE GENERATOR/GAS SCRUBBER

[76] Inventor: Daniel E. Pike, 19 Jay St., Harrington Park, N.J. 07640

[21] Appl. No.: 557,616

[22] Filed: Jul. 24, 1990

[51] Int. Cl.$^5$ .................................................. B01D 47/00
[52] U.S. Cl. ........................................... 55/230; 261/90
[58] Field of Search ................... 55/230; 261/83, 116, 261/88, 89, 90

[56] References Cited

U.S. PATENT DOCUMENTS

| | | | |
|---|---|---|---|
| 1,253,766 | 1/1918 | Alden | 261/79.2 |
| 1,650,292 | 11/1927 | Miscampbell | 261/88 |
| 2,235,998 | 3/1941 | Kleinschmidt | 261/79.2 |
| 2,310,411 | 2/1943 | Fisher | 261/79.2 |
| 2,850,322 | 9/1958 | Ingram | 299/63 |
| 3,104,803 | 9/1963 | Flatt | 230/116 |
| 3,528,781 | 9/1970 | Gelfman et al. | 23/284 |
| 3,596,885 | 8/1971 | Stone | 261/84 |
| 3,637,192 | 1/1972 | Giconi | 261/17 |
| 3,641,742 | 2/1972 | Vizza | 55/222 |
| 3,653,186 | 4/1972 | McLendon | 55/223 |
| 3,660,045 | 5/1972 | Gladu | 23/277 C |
| 3,693,326 | 9/1972 | Deane | 55/230 |
| 3,701,237 | 10/1972 | Smuck | 55/230 |
| 3,708,241 | 2/1973 | Theis, Jr. et al. | 415/80 |
| 3,726,064 | 4/1973 | Rowley | 55/241 |
| 3,756,021 | 9/1973 | Eskeli | 60/39.02 |
| 3,758,223 | 9/1973 | Eskeli | 415/1 |
| 3,761,549 | 9/1973 | Eskeli | 60/330 |
| 3,796,549 | 3/1974 | Hall | 23/277 C |
| 3,828,553 | 8/1974 | Eskeli | 60/330 |
| 3,888,642 | 6/1975 | Toyama | 55/263 |
| 3,930,744 | 1/1976 | Theis, Jr. | 415/53 R |
| 3,938,336 | 2/1976 | Eskeli | 60/682 |
| 3,969,093 | 7/1976 | Murray, Jr. | 55/229 |
| 3,971,642 | 7/1976 | Perez | 55/223 |
| 3,976,389 | 7/1976 | Theis, Jr. | 415/25 |
| 3,996,093 | 6/1976 | Nicholson | 55/238 |
| 4,008,056 | 2/1977 | Potter | 55/92 |
| 4,012,164 | 3/1977 | Eskeli | 415/53 R |
| 4,027,483 | 6/1977 | Wahl | 60/641 |
| 4,030,856 | 6/1977 | Eskeli | 415/80 |
| 4,060,336 | 11/1977 | Their, Jr. et al. | 415/80 |
| 4,068,975 | 1/1978 | Eskeli | 415/8 |
| 4,094,170 | 6/1978 | Kantor | 62/499 |
| 4,200,765 | 7/1978 | Kantor | 62/499 |
| 4,212,654 | 7/1980 | Caraway | 55/91 |
| 4,224,108 | 9/1980 | Takahashi et al. | 196/122 |
| 4,226,603 | 10/1980 | Larsson et al. | 55/260 |
| 4,257,792 | 3/1981 | Cremo | 55/230 |
| 4,278,396 | 7/1981 | Vander Horst | 415/63 |
| 4,334,897 | 6/1982 | Brady et al. | 55/257 PV |
| 4,336,039 | 6/1982 | Sohre | 55/277 |
| 4,338,090 | 6/1982 | Streeter | 55/228 |
| 4,354,801 | 10/1982 | LaBaire | 415/80 |
| 4,406,121 | 9/1983 | Pelto | 60/330 |
| 4,408,951 | 10/1983 | Ishii | 415/36 |
| 4,430,042 | 2/1984 | House | 415/1 |

(List continued on next page.)

FOREIGN PATENT DOCUMENTS 274602  5/1914  Fed. Rep. of Germany ........ 55/230

*Primary Examiner*—Bernard Nozick
*Attorney, Agent, or Firm*—Klauber & Jackson

[57] ABSTRACT

A pressure generator and gas scrubber includes a scroll casing having a gas discharge outlet and a plurality of liquid outlets; a hollow shaft extending through the casing for supplying water thereto; a plurality of radially-extending water feed tubes centrally positioned in the casing and secured to the hollow shaft in fluid communication therewith, each tube having an open outlet end at the free end thereof such that liquid supplied through the hollow shaft travels to the open outlet ends of the feed tubes and each tube having a constricted opening at the open outlet end thereof; a drive motor connected to the hollow shaft for rotating the hollow shaft and the plurality of feed tubes; and two gas inlet boxes positioned on opposite sides of the scroll casing in fluid communication with a central portion of the casing, for supplying a contaminated gas to be scrubbed to the casing adjacent the inlet ends of the feed tubes, such that water jets ejected from the open outlet ends of the feed tubes pull the gas adjacent the inlet ends into scrubbing contact with the water and create a positive pressure.

12 Claims, 4 Drawing Sheets

U.S. PATENT DOCUMENTS

| | | | |
|---|---|---|---|
| 4,440,554 | 3/1984 | Perry | 55/241 |
| 4,441,322 | 4/1984 | Ritzi | 60/649 |
| 4,448,024 | 5/1984 | Molini | 60/649 |
| 4,460,517 | 7/1984 | Calaceto | 261/23.1 |
| 4,464,309 | 8/1974 | Linhardt | 261/23 R |
| 4,514,196 | 4/1985 | Herrlander | 55/223 |
| 4,533,367 | 8/1985 | Hadzismajlovic | 55/91 |
| 4,578,226 | 3/1986 | Adlhock et al. | 261/74 |
| 4,594,081 | 6/1986 | Kroll et al. | 55/222 |
| 4,659,520 | 4/1987 | Tarver | 261/25 |
| 4,701,194 | 10/1987 | Weyers et al. | 55/228 |
| 4,776,752 | 10/1988 | Davis | 415/25 |
| 4,810,268 | 3/1989 | Chambers et al. | 55/84 |
| 4,822,531 | 4/1989 | Rudick et al. | 261/25 |
| 4,828,768 | 5/1989 | Talmor | 261/116 |
| 4,859,219 | 8/1989 | Huang | 55/223 |

PRESSURE GENERATOR/GAS SCRUBBER

BACKGROUND OF THE INVENTION

The present invention relates generally to the treatment and handling of gases discharged in various industrial processes, and more particularly, is directed to a novel pressure generator and/or gas scrubber.

Because various industrial processes generate contaminated gases, systems are required for treating and handling the discharged gases to prevent contamination of the atmosphere and/or to render the gases usable with heat recovery equipment employed in these processes. Thus, for example, various gas scrubbing devices, such as venturi scrubbers, plate towers, packed-bed scrubbers, mobile-bed scrubbers, spray scrubbers, cyclone scrubbers, mechanical scrubbers, fiber-bed scrubbers, electrically augmented scrubbers and the like are known. For example, venturi scrubbers are widely used for collecting fine and submicrometer solid particulate, condensing tars and mists, mixtures of liquids and solids.

In a venturi scrubber, a venturi tube is provided. Gas is supplied by a fan, blower or the like through the venturi tube, and a liquid, such as water, is supplied to the throat of the venturi tube in a direction transverse to the gas flow. Accordingly, at the throat, the water is atomized so as to collect the particulate matter in the gas. Thereafter, the atomized water containing the solid particulate, and the gas, are supplied to a cyclone separator to separate the gas from the water and solid particulates therein.

However, the use of venturi (and other) scrubbers in a power plant, for example, is extremely undesirable. This is because of the large pressure drop over the scrubber, primarily due to the supply of water to the throat of the venturi tube. In other words, the water supplied transverse to the direction of gas flow provides an increase in pressure drop. As a result, it is necessary to provide a fan, blower or the like to generate the necessary pressure to accelerate the gas through the venturi scrubber. This is, in turn, results in a substantial power consumption. As an example, a 6,000 H.P. fan motor may be necessary for a twelve-foot diameter venturi tube which is fifty feet long.

In a power plant of the aforementioned type in which coal is burned to produce electricity, there is an approximately 80% efficiency in such conversion. However, with the use of a venturi scrubber, there is a further drop of 5% to 6% in such efficiency over the entire power plant installation, resulting in millions of lost dollars. This is because an additional fan motor is generally required to drive the gases through the power plant. For example, in the boiler for coal conversion, there may be a 10" $H_2O$ pressure drop, with an additional 20" $H_2O$ pressure drop across the venturi scrubber. This would then require a fan motor at the output of the cyclone separator sufficient to create a pressure of 30" $H_2O$ to compensate for the aforementioned pressure drops. This, however, results in a large reduction in the efficiency of the power plant.

OBJECTS AND SUMMARY OF THE INVENTION

Accordingly, it is an object of the present invention to provide apparatus for generating pressure and/or scrubbing gas that overcomes the aforementioned problems with the prior art.

It is another object of the present invention to provide apparatus for generating pressure and/or scrubbing gas that efficiently cleans a contaminated gas of solid particulate therein.

It is still another object of the present invention to provide apparatus for generating pressure and/or scrubbing gas that generates a positive pressure during the gas scrubbing operation thereof.

It is yet another object of the present invention to provide apparatus for generating pressure and/or scrubbing gas that eliminates the requirement of a fan or blower to pull the contaminated gas into scrubbing contact with the water.

In accordance with an aspect of the present invention, apparatus for generating pressure and/or scrubbing gas includes a casing having a gas outlet and at least one liquid outlet; rotating means for generating a positive pressure and for scrubbing gases supplied to the casing, the rotating means including a plurality of radially extending feed tubes positioned in the housing, each tube having an open outlet end and an inlet end; liquid supply means for supplying liquid to the inlet ends of the feed tubes; gas supply means for supplying a gas to the casing at a position adjacent the inlet ends of the feed tubes; and drive means for rotatably driving the rotating means, wherein the liquid ejected from the open outlet ends of the feed tubes pulls the gas adjacent the inlet, ends into scrubbing contact with the liquid and results in formation of the positive pressure at the gas outlet of the casing.

In accordance with another aspect of the present invention, apparatus for generating pressure and/or scrubbing gas includes a casing having a gas outlet and at least one liquid outlet; rotating means for accelerating a liquid to a peripheral tip speed of the rotating means, the rotating means including a radially inner end and a radially outer end; liquid supply means for supplying liquid to the rotating means; gas supply means for supplying gas to the casing at a position adjacent the radially inner end of the rotating means; and drive means for rotatably driving the rotating means, wherein the liquid accelerated by the rotating means pulls the gas adjacent the radially inner end into scrubbing contact with the liquid and results in formation of a positive pressure at the gas outlet of the casing.

The above and other objects, features and advantages of the present invention will become readily apparent from the following detailed description thereof which is to be read in connection with the accompanying drawings.

DETAILED DESCRIPTION OF THE PREFERRED EMBODIMENTS

Figure 1:
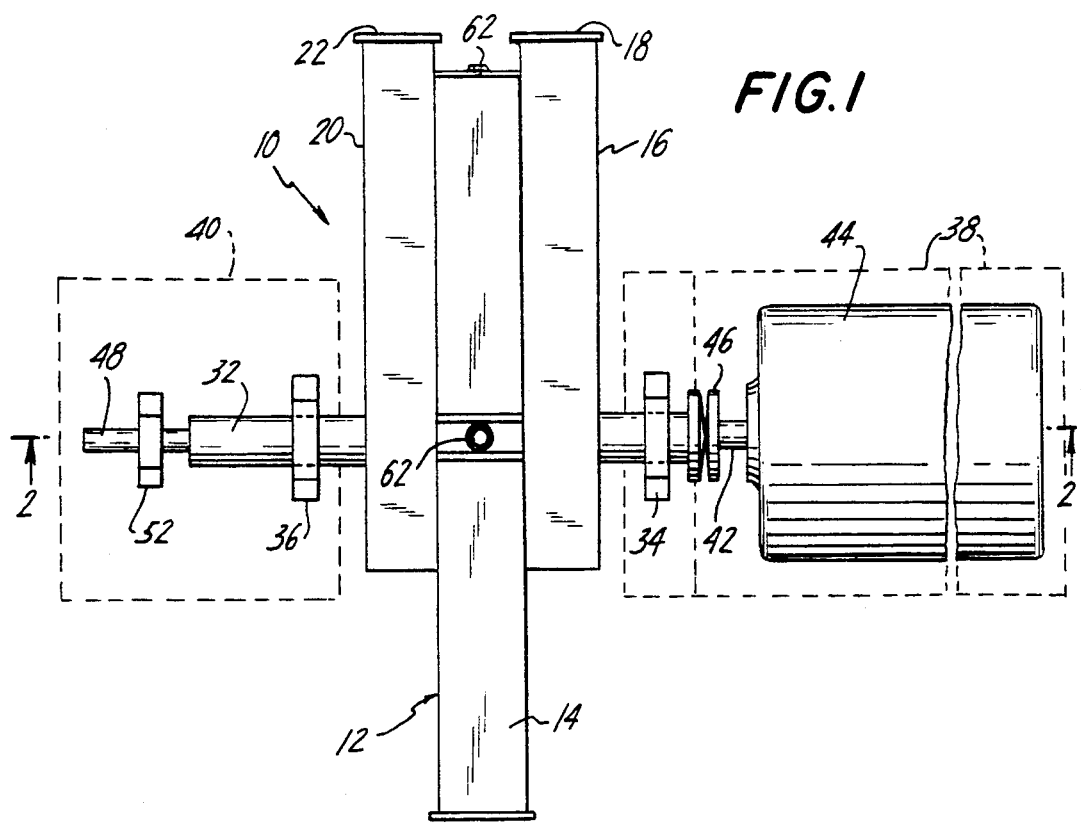
FIG. 1 is a top plan view of apparatus for generating pressure and/or scrubbing gas according to one embodiment of the present invention.
Figure 2:
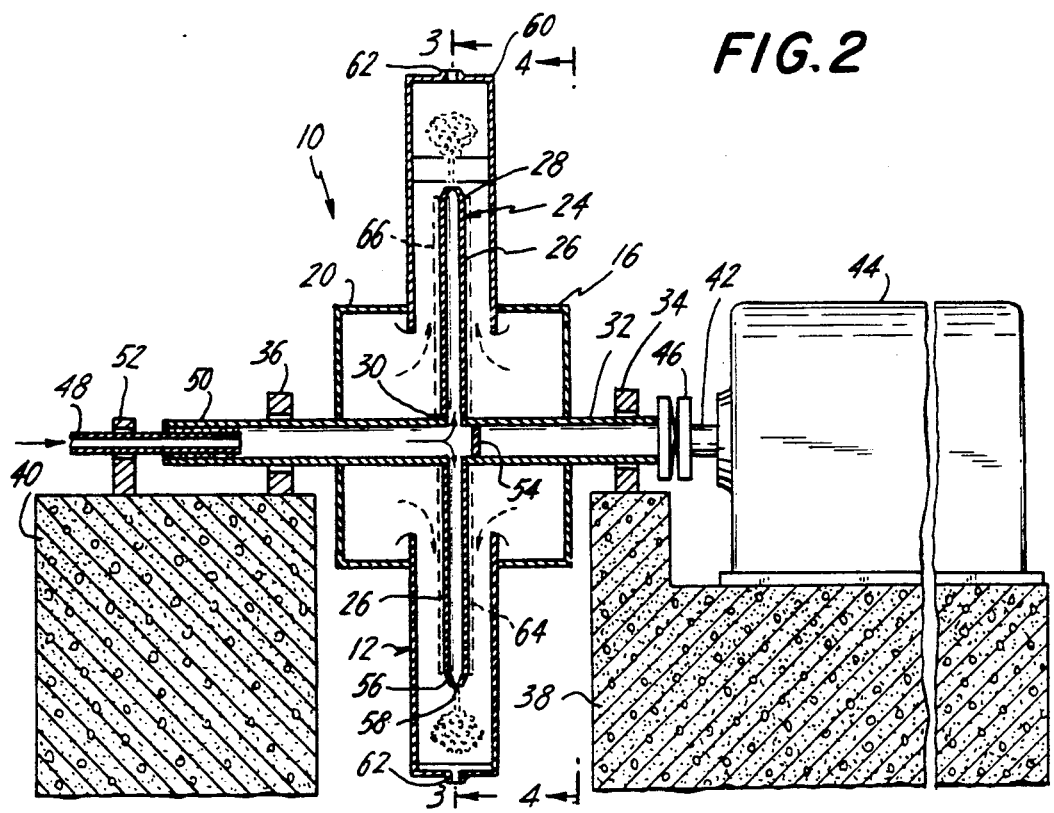
FIG. 2 is a partial cross-sectional view of the apparatus of FIG. 1, taken along line 2—2 thereof.
Figure 3:
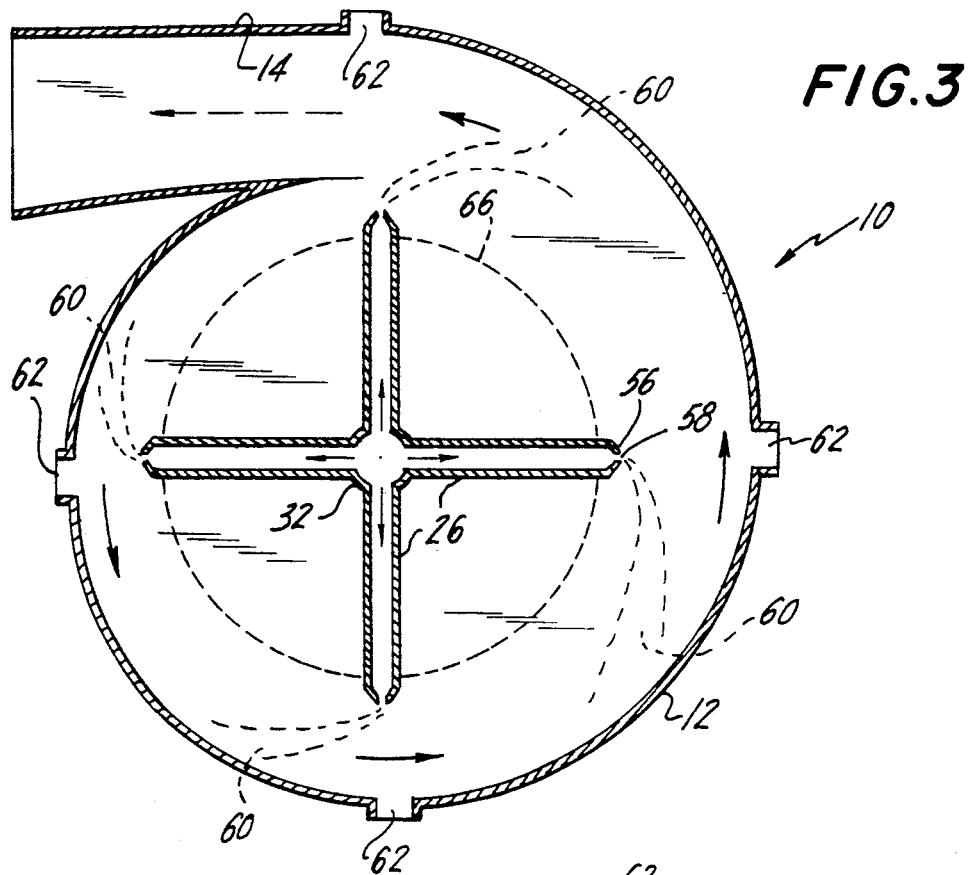
FIG. 3 is a cross-sectional view of the apparatus of FIG. 2, taken along line 3—3 thereof.
Figure 4:
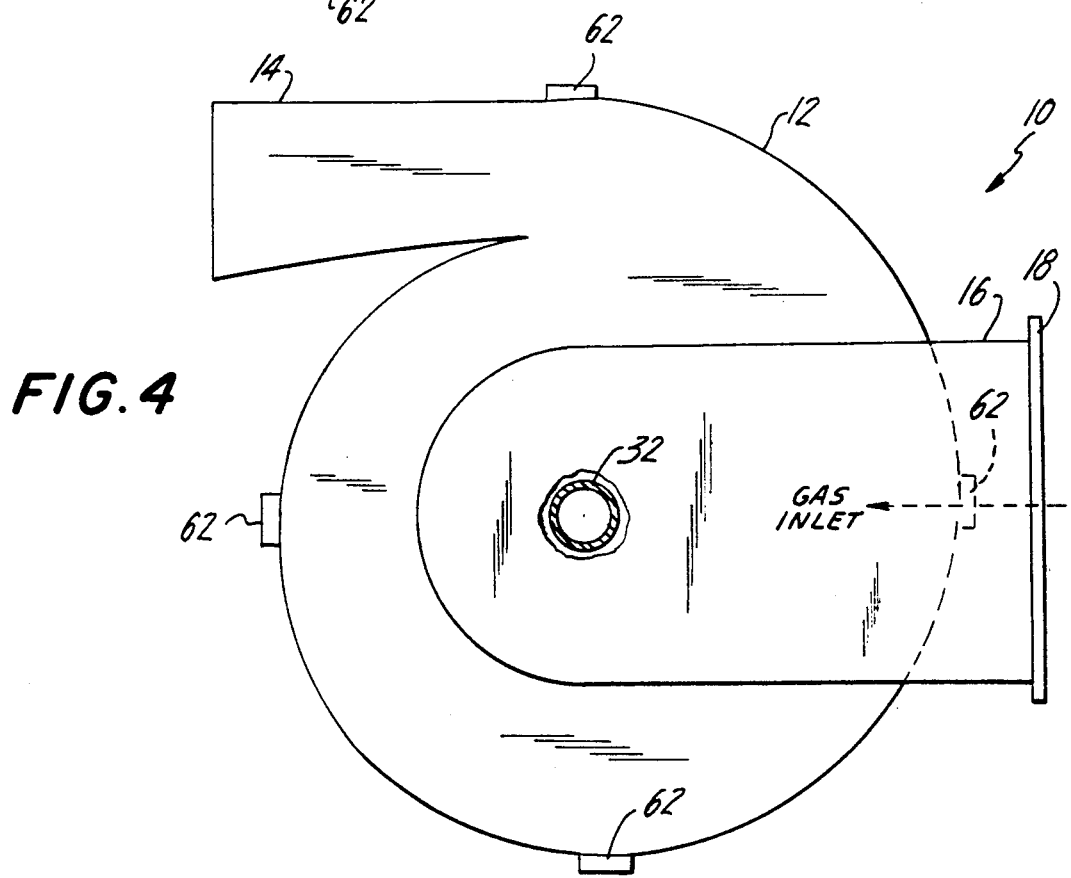
FIG. 4 is a cross-sectional view of the apparatus of FIG. 2, taken along line 4—4 thereof.

Referring to the drawings in detail, and initially to FIGS. 1-4 thereof, apparatus 10 for generating pressure and/or scrubbing gas according to one embodiment of the present invention includes a scroll or spiral casing 12 having a gas discharge outlet 14 at its upper end. A first gas inlet box 16 is provided on one side of scroll casing 12 in fluid communication therewith and includes a gas inlet opening 18 connected with the output of, for example, a power plant or the like for receiving contaminated gases. In like manner, a second gas inlet box 20 is provided on the opposite side of scroll casing 12 in fluid communication therewith, and includes a gas inlet opening 22. In this manner, contaminated gas is supplied through gas inlet openings 18 and 22 and then to scroll casing 12 through gas inlet boxes 16 and 20. As an important aspect of the present invention, which will be understood from the description which follows, the gas is supplied from gas inlet boxes 16 and 20 to the center of casing 12.

A rotatable water feed device 24 is centrally positioned within scroll casing 12 and includes a plurality of equiangularly, radially-oriented water feed tubes 26, each having an open outlet end 28 and an opposite open inlet end 30.

A hollow shaft 32 extends through first gas inlet box 16, scroll casing 12 and second gas inlet box 20, and is capable of rotating about its axis therein. In this regard, gas inlet boxes 16 and 20 are provided with openings 33 slightly larger than the outer diameter of shaft 32 to permit free rotation of shaft 32. The open inlet end 30 of each water feed tube 26 is secured to hollow shaft 32 so as to be in fluid communication with the interior thereof. In this manner, as will be described in greater detail hereinafter, a liquid such as water can be supplied to water feed tubes through hollow shaft 32.

Hollow shaft 32 is rotatably mounted in bearings 34 and 36 positioned to the exterior of gas inlet boxes 16 and 20, respectively. Bearings 34 and 36 are fixedly mounted on concrete supports 38 and 40, respectively. The end of hollow shaft 32 extending through bearing 34 is coupled to the output shaft 42 of a drive motor 44 by means of a flexible coupling 46. In this manner, hollow shaft 32 is rotated by motor 44, and accordingly, water feed tubes 26 are also rotated within scroll casing 12.

The opposite end of hollow shaft 32 extending through bearing 36 is connected with a stationary water supply pipe 48 by means of a seal bearing 50 that permits rotation of hollow shaft 32 with respect to stationary water supply pipe 48 but which prevents the escape of any water from the connection therebetween. The end of stationary water supply pipe 48 adjacent hollow shaft 32 is also supported on concrete support 38 by a support 52.

In order to insure that the water supplied from water supply pipe 48 travels only to water feed tubes 26, a disc seal 54 is provided in sealed relation within the interior of hollow shaft 32 adjacent to and just past water feed tubes 26 in the direction from water supply pipe 48.

As will further be appreciated from the discussion hereinafter, outlet ends 28 of water feed tubes 26 are preferably tapered, as at 56 to provide a smaller diameter opening 58 at the outlet end 28 of each water feed tube 26. Accordingly, a constriction is formed thereat, so that a water jet 60 is formed exiting water feed tubes 26. Of course, any other type of constriction can be formed, such as a plug (not shown) having a smaller diameter opening, or the like.

In order to drain the water from scroll casing 12, at least one drain opening 62 is provided in the outer shell of scroll casing 12. Preferably, however, a plurality of openings 62 are provided.

In operation, rotatable water feed device 24 rotates about the center line of hollow shaft 32 and water enters through stationary water supply pipe 48. Because of the constriction formed by smaller diameter opening 58 at the end of each water feed tube 26, a jet 60 of water is formed as the water exits from water feed tubes 26. At the outlet ends 28 of water feed tubes 26, the jet 60 of water is rotating with a peripheral velocity. The contaminated gas which enters scroll casing 12 adjacent the inlet ends 30 of water feed tubes 26, however, is not rotating, or at most, is rotating at a small velocity, because rotatable water feed tubes 26 do not have sufficient area such as that found in fan blades, to impart appreciable rotational velocity to the gas. Accordingly, the rotating water at the periphery of scroll casing 12 forms a suction action which pulls the gas radially outward into contact with the rotating water. Thus, immediately at outlet ends 28, the water accelerates the gas to a final velocity of the combined water and gas.

In effect, the present invention provides an action substantially identical to that in the throat of a venturi scrubber, with the exception that the water is accelerating the gas to a velocity which will approach the tip speed of rotatable water feed device 24. Thus, the atomized jets 60 of water act directly as fan blades.

However, unlike a venturi scrubber, there is a pressure rise created by the rotating water, contrary to the pressure drop that occurs in a venturi scrubber. There is thus no need to provide a fan or blower to compensate for the pressure drop that occurs in a venturi scrubber, thereby greatly increasing the efficiency of the operation.

As a result, there is an efficient scrubbing of the contaminated gases with the water jets 60. Thereafter, the cleaned gases exit through gas discharge outlet 14, while a major portion of the water containing the solid particulate from the gas is removed through drain openings 62.

It is noted that drain openings 62 must be located to remove the water collected along the wall of scroll casing 12 before such water reaches gas discharge outlet 14 and must remove the water as soon as possible to minimize drag, which would decrease the pressure generating efficiency of apparatus 10.

It will be appreciated with the aforementioned apparatus, there is no need to provide any separate fan or blower for supplying the contaminated gas to apparatus 10. This is because the water in scroll casing 12 creates a draft which pulls the gases into contact therewith to perform the scrubbing action. At the same time, the water creates a positive pressure or a pressure rise, thereby greatly increasing the gas cleaning efficiency of apparatus 10.

With venturi scrubbers, a first cyclone separator is always required after the scrubber and before the fan, and a second cyclone separator is generally required after the fan. With the present invention, there is no need to provide the first cyclone separator, as required with venturi scrubbers. Therefore, the cost and efficiency of manufacture and operation in a gas scrubbing operation is greatly reduced over prior art venturi scrubbers. Therefore, the size of the motor of the present invention can be reduced by approximately one-half or more in comparison with the fan or blower typically found at the outlet of a power plant using a venturi scrubber.

It will be appreciated that, although rotating water feed tubes 26 are not equivalent to fan blades, they do generate some rotation in the gases supplied to outlet ends 28. Therefore, in accordance with a modification, discs 64 and 66 may be secured to opposite sides of rotatable water feed device 24, as shown by dashed lines in FIGS. 2 and 3. Discs 64 and 66 prevent rotation of the gases caused by rotating water feed tubes 26. Accordingly, with discs 64 and 66, the gases will move in a substantially purely radial direction. As a result, there will be a maximum differential impact of the gases with the water, and therefore a maximum scrubbing action in order to provide a maximum gas scrubbing efficiency. With such operation, in order to increase the draft, it is only necessary to increase the water flow from stationary water supply pipe 48. In other words, variation in the draft can be easily obtained without the need of a variable speed motor, which is much more expensive than the present arrangement. However, it may be desirable, in certain situations, to eliminate discs 64 and 66, for example, when more pressure is generated than needed for the dust generating process than is needed for scrubbing.

Figure 5:
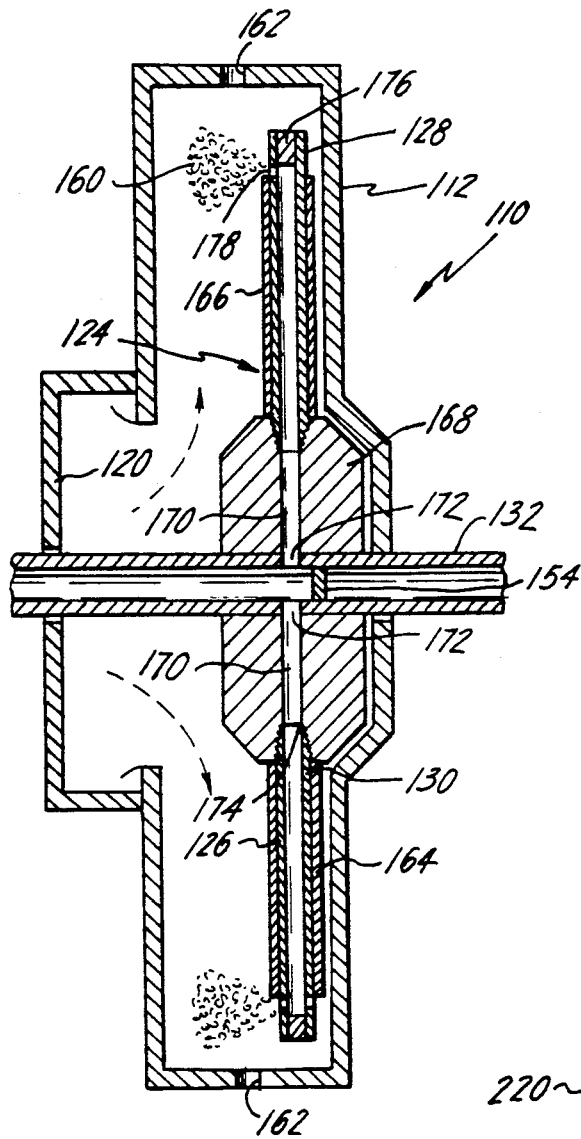
FIG. 5 is a cross-sectional view, similar to that of FIG. 2, of apparatus for generating pressure and/or scrubbing gas according to another embodiment of the present invention.

Referring now to FIG. 5, apparatus 110 for generating pressure and/or scrubbing gas according to another embodiment of the present invention will now be described in which elements corresponding to those discussed above with respect to apparatus 10 of FIGS. 1-4 are identified by the same reference numerals with a 100 prefix, and a detailed description of such common elements will be omitted herein for the sake of brevity.

Specifically, a hub 168 is mounted on hollow shaft 132 within scroll casing 112, and includes a plurality of radially-oriented through holes 170 extending therethrough. Each through hole 170 includes an inlet end 172 in fluid communication with the interior of hollow shaft 132 and an open outlet end 174. Inlet ends 130 of water feed tubes 126 are secured to hub 168 in fluid communication with outlet ends of 174 of through holes 170. For example, the inlet end 130 of each water feed tube 126 can be threadably engaged to hub 168 in sealing contact therewith to provide such fluid communication. Alternatively, water feed tubes 126 can be welded to hub 168.

Unlike apparatus 10, outlet ends 128 of water feed tubes 126 are not tapered, and a plug 176 is inserted therein to prevent water from escaping from each water feed tube 126 in a radially outward direction therefrom. Instead, a side opening 178 of reduced diameter is provided in each water feed tube 126 between the outer periphery of disc 166 and plug 176, in order to provide a constriction thereat which forms a water jet 160 that exits each water feed tube 126 in a direction parallel to the axis of hollow shaft 132.

Since there is a single side opening 178, the opposite side of rotatable water feed device 124 is not supplied with any water. Accordingly, only one gas inlet box 120 need be provided.

The arrangement of FIG. 5 provides a greater efficiency over apparatus 10 of FIGS. 1-4 since the gas always impacts at a transverse direction with water jets 160 formed at side openings 178, in order to provide a maximum scrubbing and pressure generating efficiency.

Figure 6:
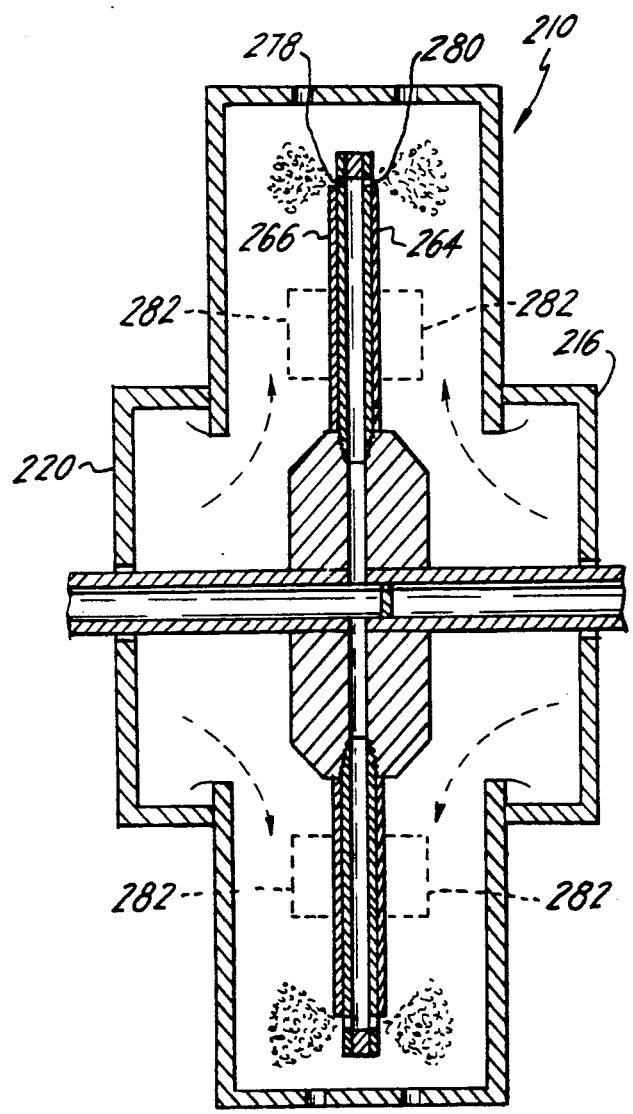
FIG. 6 is a cross-sectional view, similar to that of FIG. 5, of apparatus for generating pressure and/or scrubbing gas according to still another embodiment of the present invention.

Referring now to FIG. 6, apparatus 210 for generating pressure and/or scrubbing gas according to another embodiment of the present invention will now be described in which elements corresponding to those described above with respect to apparatus 110 of FIG. 5 are identified by the same reference numerals with a 200 prefix, and a detailed description of the common elements will be omitted herein for the sake of brevity.

Apparatus 210 differs from apparatus 110 by an additional side opening 280 at outlet end 228 of each water feed tube 226 in diametrically opposite relation to side opening 278. As a result, capacity is doubled and two gas inlet boxes 216 and 220 are provided. With this arrangement, a larger gas scrubbing operation is provided.

As with the aforementioned embodiments, it will be appreciated that discs 264 and 266 can be eliminated to provide a greater pressure generation than by means of water feed tubes 226 alone. Further, in order to provide an even greater pressure rise, with discs 264 and 266 removed, fins 282 can be provided on water feed tubes 226, as shown in dashed lines in FIG. 6.

Figure 7:
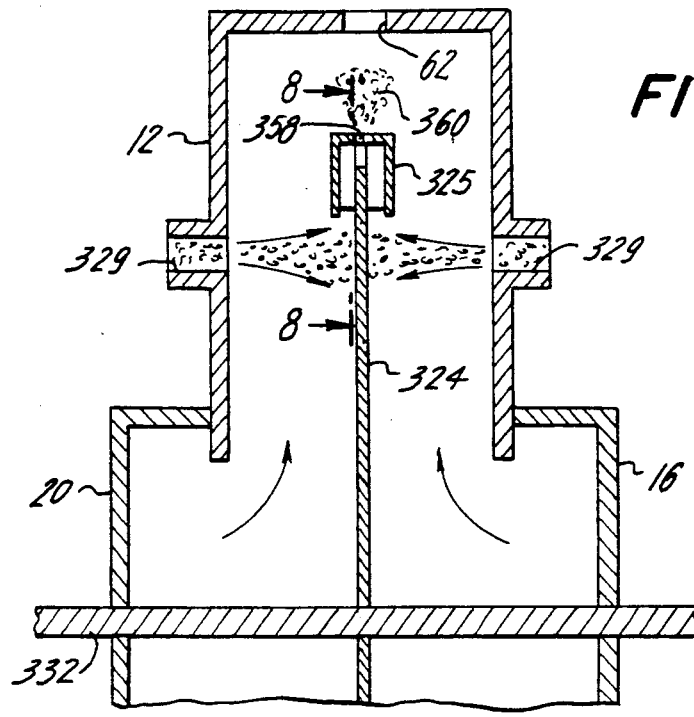
FIG. 7 is a cross-sectional view, similar to that of FIG. 2, of apparatus for generating pressure and/or scrubbing gas according to another embodiment of the present invention.
Figure 8:
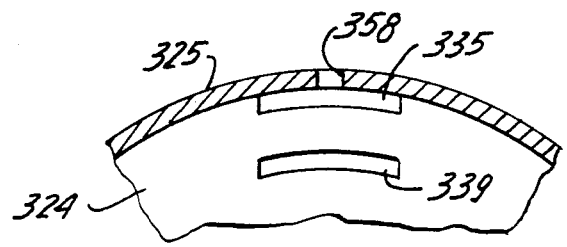
FIG. 8 is a cross-sectional view of the apparatus of FIG. 7, taken along line 8—8 thereof.
Figure 9:
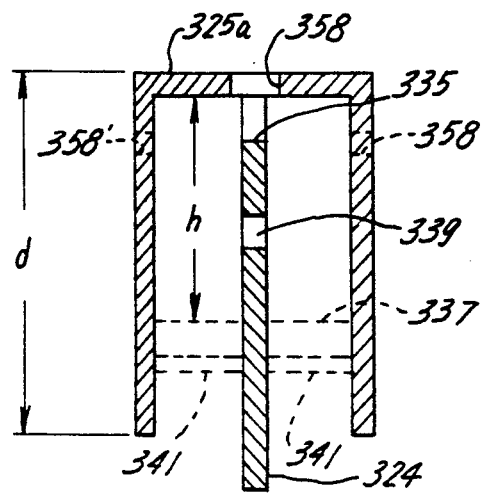
FIG. 9 is an enlarged cross-sectional view of a portion of the disc and shroud of FIG. 7.

Of course, it will be appreciated that other means can be provided within the scope of the present invention to accelerate the water to the peripheral tip speed of the rotating assembly. For example, as shown in FIGS. 7-9, a disc 324 can be rotated on a solid shaft 332, with the periphery of disc 324 positioned within and secured to an annular shroud 325 having a U-shaped cross-section. A plurality, for example, four, water jet outlets 358 are provided along the outer annular wall 325a of annular shroud 325. In this regard, disc 324 is cut away to provide arcuate openings 335 at the outer periphery thereof adjacent openings 358 to permit water to exit through openings 335 and 358. Alternatively, water jet outlets 358', shown in dashed lines in FIG. 9, can be provided.

In such case, water supplied through openings 329 in casing 12 against the sides of disc 324 will be transported radially outward to shroud 325 so as to form an annular ring of water within shroud 325 at a level h, for example, as shown by dashed line 337 in FIG. 9. The annular ring of water is accelerated with disc 324 in shroud 325 and then ejected as a water jet 360 through the shroud outlets 358 for impact with the radially moving gases.

It will be appreciated that the velocity of water through orifices 358 or 358' is predetermined. Therefore, with the diameter of the orifices known, the water pressure within shroud 325 can be determined to obtain the preset velocity from the orifices. The water pressure will be determined by the head h at level 337, the amount of water supplied through openings 329 and the rotational speed of disc 324. Therefore, the height d of shroud 325 must be sufficient to provide a head pressure necessary to force the water through orifices 358 or 358' at the desired or required velocity.

In order to provide equalization of the water on opposite sides of disc 324 within shroud 325, a plurality of arcuate openings 339 can be provided in disc 324.

Further, to provide additional stabilization of shroud 325, stabilizing arms 341 can be provided periodically along disc 324 and extending in the axial direction thereof so as to be connected with shroud 325 in order to provide stabilization.

Having described specific preferred embodiments of the invention with reference to the accompanying drawings, it will be appreciated that the present invention is not limited to those precise embodiments, and that various changes and modifications can be effected therein by one of ordinary skill in the art without departing from the spirit or scope of the invention as defined by the appended claims.

I claim:

1. Apparatus for generating pressure and scrubbing gas comprising:

a casing having a scroll casing;

a gas outlet, tangential to and in fluid communication with said scroll casing, and at least one liquid outlet;

rotating means for generating a positive pressure and for scrubbing gases supplied to said casing, said rotating means including a plurality of radially extending feed tubes positioned in said scroll casing, each tube having an open outlet end and an inlet end;

liquid supply means for supplying liquid to said inlet ends of said feed tubes;

said casing further comprising gas inlet supply means for supplying a gas to said casing at a position adjacent said inlet ends of said feed tubes, wherein said gas supply means includes at least one gas inlet box positioned on one side of said scroll casing and in fluid communication with a central portion of said scroll casing, each said gas inlet box including a gas supply inlet; and drive means for rotatably driving said rotating means such that said liquid exiting from said feed tubes rotates along a peripheral arc of said scroll casing, and said gas outlet is located in said scroll casing substantially along a tangent to said peripheral arc, wherein said liquid ejected from said open outlet ends of said feed tubes pulls said gas adjacent said inlet ends into scrubbing contact with said liquid and results in formation of said positive pressure at the gas outlet of said casing, with said scrubbed gas exiting through said gas outlet and said liquid exiting through said at least one liquid outlet.

2. Apparatus according to claim 1, wherein said gas supply means includes two gas inlet boxes, each including a gas supply inlet, said gas inlet boxes positioned on opposite sides of said scroll casing and in fluid communication with a central portion of said scroll casing.

3. Apparatus according to claim 1, wherein said liquid supply means includes a hollow shaft extending into said casing, said inlet ends of each said feed tube being secured to said hollow shaft and in fluid communication therewith, said feed tubes extending radially from said hollow shaft.

4. Apparatus according to claim 3, wherein said feed tubes extend equiangularly around said hollow shaft.

5. Apparatus according to claim 3, wherein said drive means includes a drive motor connected with said hollow shaft for rotating said hollow shaft about its axis.

6. Apparatus according to claim 3, wherein said drive motor is connected with one end of said hollow shaft, and said liquid supply means further includes a stationary liquid supply pipe connected in a rotatably, sealed manner to an opposite end of said hollow shaft.

7. Apparatus according to claim 1, wherein said outlet end of each said feed tube includes an outlet opening for emitting said liquid in an axial direction of said feed tubes.

8. Apparatus according to claim 7, wherein each of said feed tubes includes a through passageway having a first dimension, and said outlet end of each said feed tube includes a constriction which reduces said outlet opening to a dimension less than said first dimension.

9. Apparatus according to claim 8, wherein said outlet end of each said feed tube is tapered to form said constriction.

10. Apparatus according to claim 1, further including disc means for substantially reducing rotation of said gas which occurs by reason of said plurality of feed tubes, said disc means being secured to said rotating means.

11. Apparatus according to claim 10, wherein said disc means includes a first disc secured to one side of said feed tubes and a second disc secured to an opposite side of said feed tubes.

12. Apparatus according to claim 1, wherein said gas inlet supply means includes means for supplying said gas to said casing only at a position adjacent said inlet ends of said rotating means.

* * * * *